BEST AVAILABLE COPY

T858009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 42

697,038

THERMOPLASTIC COMPOSITIONS STABILIZED AGAINST COPPER EFFECT

Clarence E. Tholstrup and James C. Ownby, both of P.O. Box 511, Kingsport, Tenn. 37662

Continuation-in-part of application Ser. No. 344,564, Feb. 13, 1964. This application Jan. 11, 1968. Published Jan. 7, 1969

Class 260—897

No Drawing. 20 Pages Specification

A thermoplastic polymer composition comprising a thermoplastic polymer selected from the group consisting of polypropylene, copolymers of ethylene and propylene, blends of polypropylene and polyisobutylene, blends of copolymers of ethylene and propylene and polyisobutylene, and tri-component blends of polypropylene, polyethylene, and ethylene-propylene terpolymers, a copper effect inhibitor, said inhibitor comprising at least one hydroxy-substituted benzol-hydrazide represented by the formula:

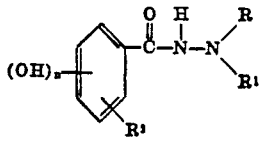

wherein $n$ is an integer of 1–3 and R, $R^1$ and $R^2$ are independently selected from the group consisting of hydrogen, alkyl, cycloalkyl, alkoxy and aryl radicals and provided that when $n$ is 1 at least one R, $R^1$, or $R^2$, is a radical other than hydrogen, which composition is useful in contact with metals such as copper, e.g. wire coating.